United States Patent [19]
Gluchowicz

[11] 3,781,069
[45] Dec. 25, 1973

[54] HYDROSTATIC BEARING

[75] Inventor: Gerszon Gluchowicz, Ddjursholm, Sweden

[73] Assignee: AB UVA, Bromma, Sweden

[22] Filed: May 24, 1971

[21] Appl. No.: 146,103

[30] Foreign Application Priority Data
May 26, 1970 Sweden.............................. 7226/70

[52] U.S. Cl. .................................. 308/5 R, 308/9
[51] Int. Cl. ........................................... F16c 17/00
[58] Field of Search....................... 308/5 R, 9, 122, 308/DIG. 1

[56] References Cited
UNITED STATES PATENTS

| 2,869,933 | 1/1959  | Bissinger...................... 308/DIG. 1 |
| 3,484,064 | 12/1969 | Koenig............................... 308/5 R |
| 3,476,444 | 11/1969 | Dunfee............................... 308/5 R |
| 3,597,020 | 8/1971  | Thomas.............................. 308/5 R |
| 3,597,021 | 8/1971  | Thomas.............................. 308/5 R |
| 3,442,560 | 5/1969  | De Gast.............................. 308/5 R |

FOREIGN PATENTS OR APPLICATIONS 1,013,299   12/1965   Great Britain ..................... 308/5 R Primary Examiner—Charles J. Myhre
Assistant Examiner—R. H. Lazarus
Attorney—Shlesinger, Fitzsimmons & Shlesinger

[57] ABSTRACT

A hydrostatic bearing in which one of the opposed bearing members has a plurality of part-pockets in it into all of which the hydrostatic fluid is pumped and each of which is surrounded by a ridge. When an impact load is applied to the bearing, the hydrostatic fluid flows out through the gaps between the ridges of the one bearing member and the opposed bearing member into drainage grooves provided in the one bearing member which are disposed between adjacent ridges, and is recirculated.

2 Claims, 3 Drawing Figures

PATENTED DEC 25 1973

3,781,069

INVENTOR.
GERSZON GLUCHOWICZ
BY
Shlesinger, Fitzsimmons & Shlesinger
ATTORNEYS

HYDROSTATIC BEARING

BACKGROUND OF THE INVENTION

The invention relates to a hydrostatic bearing. Hydrostatic bearings are used in many cases of relative movement between machine parts, which cooperate with each other, such as, e.g., a shaft and a bearing casing or a machine table and a stand or support. The main advantages with such bearings are elimination of metallic contact and therewith static friction between the machine parts in consideration, production of small friction forces by movements between said parts and practically total elimination of wear on the bearing surfaces.

THE PRIOR ART

The preponderating type of hydrostatic bearing consists in its simplest shape, in addition to the bearing element proper, of a source of pressure fluid and a throttle member. Of the two surfaces of the bearing, one is provided with a plurality of pockets or recesses, which laterally are confined by projections, which in the following will be called ridges. A device of this type operates principally in such a manner that pressure fluid is pumped into the pockets in the bearing from which pressure fluid leaks out through the gaps, which are formed between, at one hand, the ridges on the one bearing surface and, at the other hand, the second or opposite bearing surface. After its passage through the gaps, the pressure fluid is collected and returned to a fluid storage member. The width of the gaps and therewith the throttling resistance, which they present to the fluid, varies with the spacing between the bearing surfaces. The bearing surfaces will automatically adapt their spacing from each so that the pressure within each pocket, which is produced by said throttling resistance at every moment corresponds to the external load on the bearing elements, i.e., in such a manner that the elements mounted in the bearing are in balance. the maximum pressure in the pocket, which corresponds to the case, when the gap width is equal to zero, is limited to the pump pressure, and this maximum pump pressure corresponds in turn to a maximum load, which is determined by the area of the pocket and the pumping pressure.

The pressure fluid is fed to the individual pocket via a primary throttling means and the pressure within the pocket will thereby, provided that the pumping pressure does not vary too much, be determined entirely by the gap width. In many cases the load carrying capacity of the bearing is of very great importance. In connection with machine tools, the so-called stiffness is of decisive importance. This stiffness is generally understood to mean that relative displacement, which is produced between the bearing surfaces in response to a certain force or a certain load acting on the bearing. The greater force or load is required for reducing the gap by a length unit, for example 1 micron, the stiffer the system is and therewith the machine also. This stiffness is often defined as the static stiffness, which stiffness is determined by causing a load to act on the machine and by measuring the reduction of the width of the gap after a predetermined period of time. The displacement of the bearing surfaces relative one another, i.e., the reduction of the leakage gap adjacent the pocket, does, however, not take place in a continuous manner, but with some excess displacement to a minimum gap width during which the pressure in the pocket is built up in such a manner, that the bearing surfaces in response to said pressure are displaced again, but now away from one another into a state of balance. This excess movement results in grave problems from the dynamic viewpoint, since the excess movement as such involves great problems in connection with machine tools. It has been tried to provide statically stiff bearings by applying regulating systems, which vary the flow passage area of the throttle member between the pocket and the pump in response to an increase of pressure coming into existence, whereby the outward flow through the gap can rapidly be compensated by increased flow through the throttle member. However, such regulating systems are expensive and difficult to construct and result normally in that the dynamic stiffness is impaired.

OBJECTS OF THE INVENTION

One main object of the invention is thus to provide a hydrostatic bearing, which without any regulating system permits good dynamic rapidity.

SUMMARY OF THE INVENTION

According to one main feature of the invention each of the individual pressure fluid pockets is subdivided into a plurality of part-pockets having their lateral edges facing one another and fed with pressure fluid through associated pressure fluid feeder channels from a pressure fluid supply conduit connected to a throttle member common to all part pockets, each part-pocket being confined by a throttling ridge cooperating with the opposite bearing surface and a draining groove being provided between adjacent ridge portions of adjoined part-pockets.

BRIEF DESCRIPTION OF THE INVENTION

Further objects and advantages of the invention will become apparent from the following description, considered in connection with the accompanying drawing, which forms part of this specification, and of which FIG. 1 is a diagrammatic sectional view of a hydrostatic bearing of known type, FIG. 2 is a top view of the bearing surface formed with the pocket of FIG. 1 and FIG. 3 is a simplified top view of a pocket formed in accordance with the invention.

DETAILED DESCRIPTION OF THE DRAWING FIGURES

Figure 1:
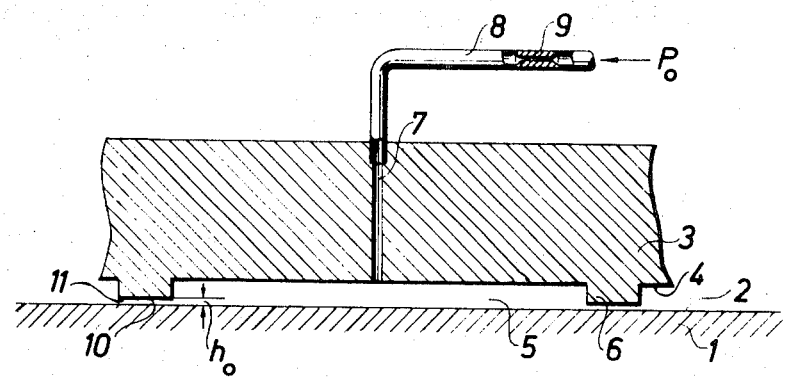

With reference to the drawings, FIG. 1 shows a part of a known hydrostatic bearing represented in section. A bearing surface 2, which may be plane or, for example, cylindrical and is formed on a machine bed 1 or a shaft, cooperates with a bearing 3, which has a bearing surface 4 and a pressure fluid pocket or recess 5. This bearing part 3 may be formed on a slide block or carriage or a similar machine part, which is displaceable in relation to the bearing surface 2 on the bearing part, or has the shape of a bearing surrounding a shaft. The pocket 5, which here is shown to be of rectangular configuration is along its entire circumference confined by a ridge 6 projecting from the bearing surface 4 and having rectangular configuration also. Pressure fluid is fed to the pressure fluid pocket 5 through a channel 7, which is connected to a conduit 8 provided with a throttle member 9 and connected to a pressure fluid pump not shown in the drawing.

When pressure fluid is fed to the pocket 5, the pressure in said pocket will, when the surface 10 of the ridge 6 facing the bearing surface 2 bears against said surface, become equal to the output pressure $P_0$ of the pump. In this way a force is produced between the bearing surface 2 and the pocket, which is equal to the pressure $P_0$ multiplied by the area of the pocket. Provided that the load force which forces the surface 2 against the surface 10 is less than the pressure force within the pocket 5, the bearing part 3 will be lifted away from the part 1 mounted in the bearing and thereby a throttling gap will be formed between the surface 10 and the surface 2 through which gap pressure fluid flows out until balance has been established between said forces.

Since the throttle member 9 has a constant passage flow area, the pressure in the pocket will in the position of rest illustrated in FIG. 1 be determined by the gap 11 surrounding the pocket, the sole variable of which gap is the gap width $h_0$. To bring about the required dynamic stiffness, which as already pointed out is of very high importance in connection with machine tools, the arrangement must be such that when an impact or rapid load acts on the bearing resulting in a reduction of the gap width $h_0$, the reduction of $h_0$ must become almost equal to zero, which in turn implies that the variation of the outflow through the gap 11 caused by the reduction of $h_0$ must be equalized rapidly or totally avoided. This effect could be obtained by dimensioning the gap width very small, e.g., of the order of magnitude of 5 microns, but this would necessitate a finishing working of the bearing surfaces, which is not realizable in practice, and further require so small gap widths and so little flow passage area in the throttle member 9 as to expose said member to the imminent danger of becoming clogged by impurities in the normal pressure fluid, oil, or by oil molecules adhering to the walls of the throttle passage due to electrostatical charging, which would result in the flow passage area no longer remaining of constant size.

Figure 2:
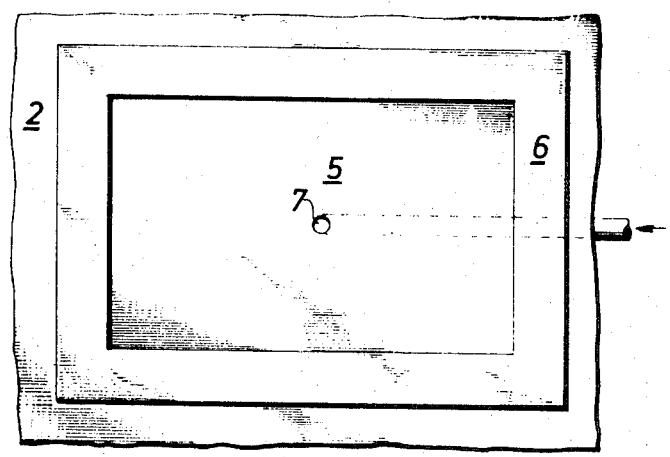

Thus, with known hydrostatic bearings of the type shown in FIGS. 1 and 2, there exists no possibility of bringing about the required dynamic stiffness because firstly the throttle member 9 must have so great a flow passage area that any danger of clogging is avoided, which in turn results in that secondly for a predetermined circumference of the pocket, the gap width $h_0$ must be made so great that it becomes impossible on occurance of an impact to avoid a reduction of the width $h_0$ of the gap, which has a highly disturbing effect on the operation of machine tools.

This problem is wholly solved by the invention, which renders it possible to arrange a pocket within the same area of the bearing surface as hitherto, but which pocket has a total circumference, which is a multiple of the circumference of the conventional pocket and which thus renders possible ample flow with a small gap width and with a large flow passage area in the throttle member 9. The invention is illustrated in a simplified manner in FIG. 3, which shows the bearing surface of the bearing part 3 with the novel pocket. As will be seen from FIG. 3, the pocket 5 of FIG. 2 has been subdivided into a plurality of part-pockets, the number of which is four in the illustrated embodiment and which are denominated 5a, 5b, 5c and 5d. Each part-pocket, such as, e.g., the part-pocket 5a, is confined by a ridge 6 of the same type as shown in FIG. 1, and between adjacent part-pockets, which are shown here to have rectangular configuration with the elongated sides adjacent each other, a drainage groove 12 is provided, to which groove pressure fluid that streams through the gap portions 11 located adjacent each other, flows to escape into a collecting receptacle not shown in the Figure. Each part-pocket is through an associated feeder channel 7a, 7b, 7c and 7d, respectively, connected through the conduit 8 to the common throttle member 9. Since the pocket shown in FIG. 3 has a total gap length, which is about 2.5 times greater than the gap length of the embodiment shown in FIGS. 1 and 2, it is easily understood that with unchanged size of the flow passage area of the throttle member 9, the gap width can be reduced considerably without reducing the passage flow and thereby a very rapid replacement of the fluid volume expelled through the gaps 11 by an impact load is effected, which in turn results in great dynamic stiffness.

By the invention a hydrostatic bearing has thus been provided, in which each pocket does not occupy more space than a conventional pocket and which in spite thereof allows ample flow of pressure fluid through the throttle member 9 for the minimum practically realizable gap width $h_0$, i.e. a hydrostatic bearing processing extremely great dynamic stiffness without any appreciable reduction of the load carrying capacity thereof.

Figure 3:
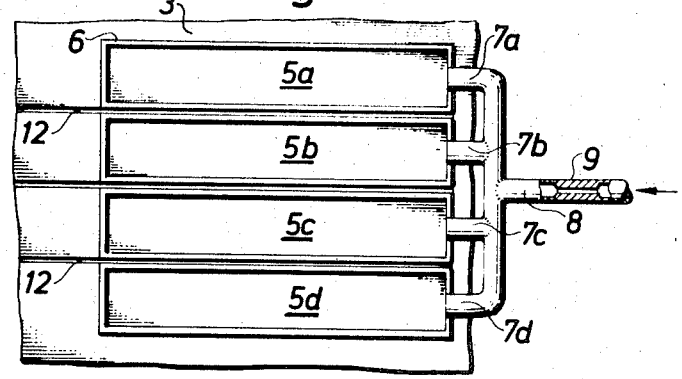

In FIG. 3 only one pocket subdivided into part-pockets has been illustrated. For practical application the bearing part 3 is in a manner, known per se, formed with a plurality of such pockets, namely at least three and usually four pockets in order to attain required balancing in the journalling of the bearing part.

While one more or less specific embodiment of the invention has been shown and described, it is to be understood that this is for purpose of illustration only, and that the invention is not to be limited thereby, but its scope is to be determined by the appended claims.

What is claimed is:

1. A hydrostatic bearing comprising
    two bearing members mounted for relative movement therebetween, and with their cooperating bearing portions in opposed relation,
    the bearing portion of one of said members having a pocket therein which is subdivided into and consists of a plurality of pressure fluid part-pockets separated from one another and each surrounded by a separating throttle ridge, which cooperates with the bearing portion of the other member,
    said bearing portion of said one member having drainage grooves therein disposed between the ridge portions of adjoining part-pockets, and
    means connecting said part-pockets to a source of pressure fluid for maintaining said bearing portions in spaced relation with a gap therebetween during use, comprising
    a pressure fluid supply conduit,
    a plurality of pressure fluid supply ducts con-nected to said supply conduit and equal in number to said part-pockets, one being connected to each separate part-pocket, and
    a single throttle member disposed in said supply conduit to stabilize the fluid pressure in all said ducts.

2. A hydrostatic bearing as claimed in claim 1, wherein said part-pockets are of equal size and of rectangular configuration in cross section and are disposed with their elongated lateral sides in parallelism, and said drainage grooves are disposed between the adjacent sides of adjoining part-pockets.

\* \* \* \* \*